United States Patent [19]

Clark et al.

[11] Patent Number: 5,017,024
[45] Date of Patent: May 21, 1991

[54] SEAL ASSEMBLY

[76] Inventors: Paul H. Clark, 1921 S. Xanthus, Tulsa, Okla. 74104; Deborah A. Yager, 9932 N. Memorial, Owasso, Okla. 74055; Randal W. Clark, Jr., 8017 S. Sandusky, Tulsa, Okla. 74136

[21] Appl. No.: 512,090

[22] Filed: Apr. 11, 1990

Related U.S. Application Data

[63] Continuation of Ser. No. 224,664, Jul. 27, 1988, abandoned.

[51] Int. Cl.⁵ .................. F16C 33/78; F16J 15/32; F16J 15/34
[52] U.S. Cl. .................. 384/482; 277/95; 277/152; 277/226; 384/484; 384/485
[58] Field of Search ........................ 277/226

[56] References Cited

U.S. PATENT DOCUMENTS

| | | | |
|---|---|---|---|
| 2,584,227 | 2/1952 | Potter | 384/482 |
| 2,872,219 | 2/1959 | Cobb | 277/169 |
| 2,878,084 | 3/1959 | Bermingham . | |
| 3,028,203 | 4/1962 | Lund et al. . | |
| 3,203,740 | 8/1965 | Peickii et al. . | |
| 3,206,262 | 9/1965 | Haag | 384/484 |
| 3,311,430 | 3/1967 | Christensen et al. | 384/482 |
| 3,363,952 | 1/1968 | Paterson . | |
| 3,397,020 | 8/1968 | Edwards | 384/484 |
| 3,428,375 | 2/1969 | Martin | 384/482 |
| 3,519,316 | 7/1970 | Gothberg | 384/485 |
| 3,741,615 | 6/1973 | Otto . | |
| 3,790,238 | 2/1974 | Otto | 384/486 |
| 3,813,102 | 5/1974 | Derman | 384/484 X |
| 3,923,351 | 12/1975 | Frost | 384/486 |
| 3,994,545 | 11/1976 | Van Dorn | 384/485 X |
| 4,304,412 | 12/1981 | Ladin | 277/94 |
| 4,421,326 | 12/1983 | Drygalski | 277/50 |
| 4,470,608 | 9/1984 | Warren | 277/164 |
| 4,478,463 | 10/1984 | Takai et al. | 384/482 |
| 4,516,783 | 5/1985 | Mitsue et al. | 277/50 |
| 4,632,404 | 12/1986 | Feldle et al. | 277/68 |
| 4,650,195 | 3/1987 | Dreschmann et al. | 384/484 X |
| 4,763,905 | 8/1988 | Zuonar | 384/484 |

FOREIGN PATENT DOCUMENTS

| | | | |
|---|---|---|---|
| 1939597 | 2/1970 | Fed. Rep. of Germany | 384/484 |
| 195544 | 7/1967 | U.S.S.R. | 384/486 |
| 814958 | 6/1959 | United Kingdom | 277/95 |

OTHER PUBLICATIONS

Nilos Ringss, Catalog #Z122e, pertinent pp. 4–8, and 10–15 (Date unknown).

*Primary Examiner*—Allan N. Shoap
*Attorney, Agent, or Firm*—Laney, Dougherty, Hessin & Beavers

[57] ABSTRACT

A seal assembly includes a stiff annular case and a resilient annular seal. The seal has a peripheral rim connected to a peripheral edge of the case and a peripheral rim extending radially from the case for resiliently radially sealing against a first surface, such as a shaft or shaft housing, spaced radially from the case. An intermediate rim extends axially from the body of the seal relative to the seal and case for resiliently axially sealing against a second surface, such as the outside surface of an antifriction bearing, located axially adjacent the case and extending between the first surface and the case. The peripheral edge of the case to which the seal is connected may be skewed at an obtuse angle relative to a radial flange of the case. The seal extends radially outward from the case in one embodiment and radially inward from the case in another embodiment.

15 Claims, 2 Drawing Sheets

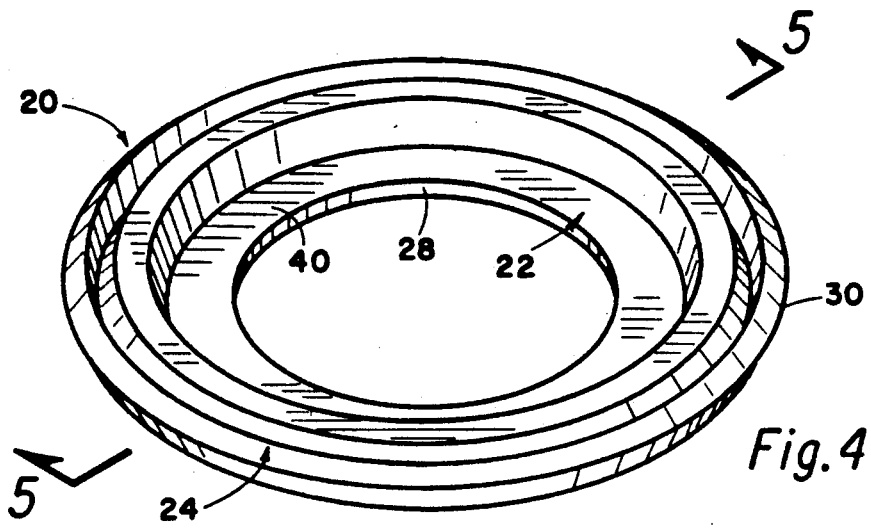
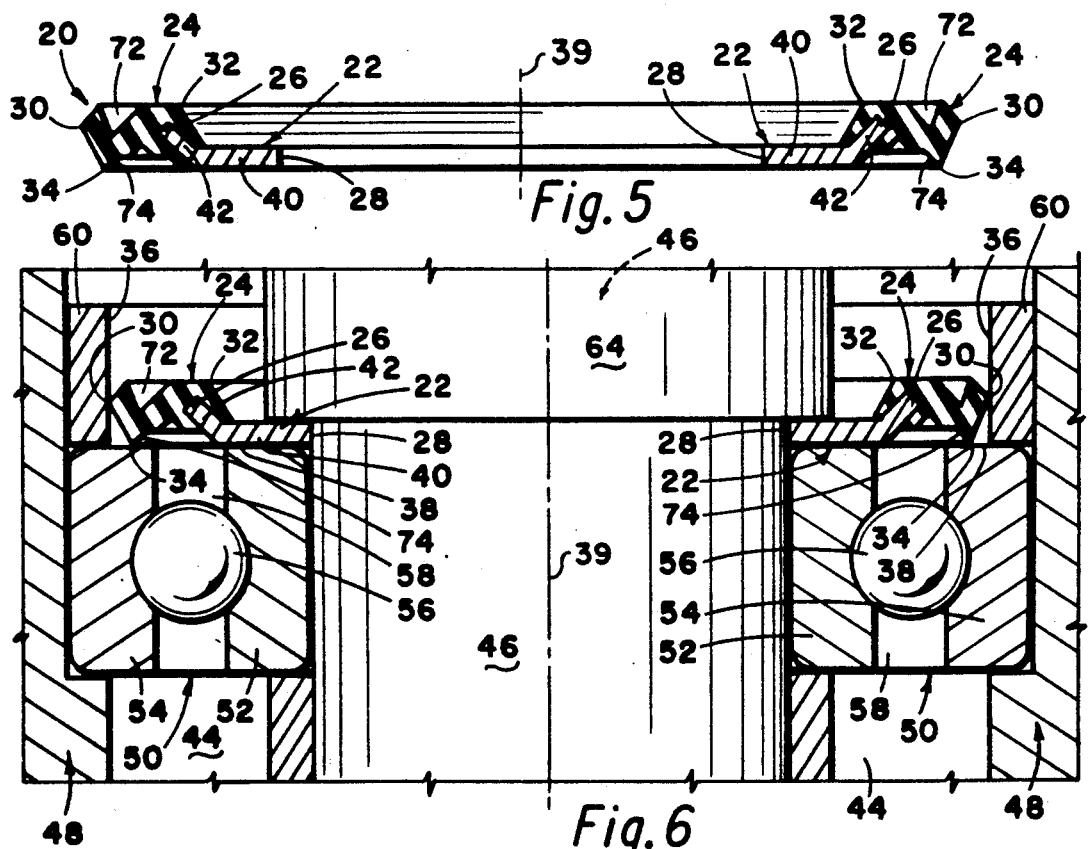
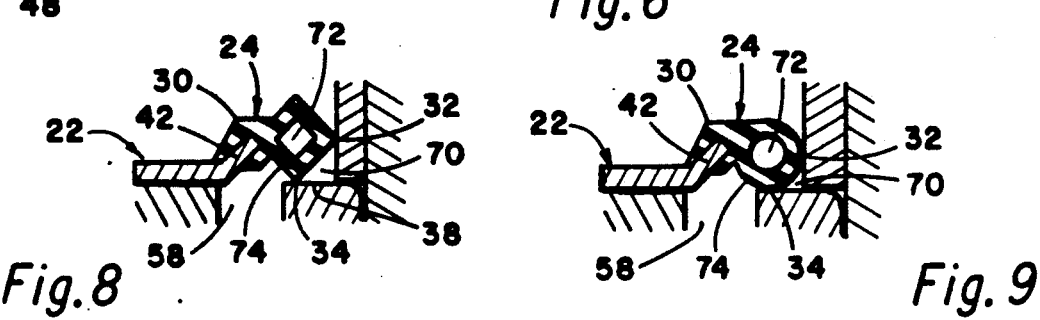

SEAL ASSEMBLY

This application is continuation of co-pending application Ser. No. 07/224,664, filed on July 27, 1988, now abandoned.

BACKGROUND OF THE INVENTION

This invention relates to seal assemblies and more particularly to lubricant seal assemblies having multiple sealing lips for both sealing a lubricant in a chamber and for preventing the admission of outside foreign material and contaminants to the sealed chamber.

Seal assemblies having multiple sealing lips have been known for some time. Typically, these assemblies include a metal-like case and an elastic-like seal. The seal may consist of one or more elastic-like pieces and each piece may have one or more sealing lips. The prior seal assemblies are designed to fit at least partially within one of the races or bearing rings of an antifriction bearing and the multiple sealing lips seal against a surface inside the bearing race, i.e., an inside surface of the antifriction bearing ring, or against the housing into which the antifriction bearing is placed. The prior seal assemblies having elastic-like seals are typically designed for a specific application and the antifriction bearing and/or housing with which the seal is to be used must be custom manufactured to accommodate the seal assembly. Supplementary seal assemblies, i.e., seal assemblies which are not custom matched to bearings, are available which seal against the outside surface or face of antifriction bearings. The seal assemblies are made of an all metal stamping which effects at least a portion of its sealing by cutting a groove in the face of the bearing ring. The supplementary seal assemblies known to the inventor do not provide a seal assembly with a resilient seal which resiliently axially seals against an outside face of an antifriction bearing and resiliently radially seals against the housing in which the antifriction bearing is contained.

SUMMARY OF THE INVENTION

The seal assembly of the present invention includes a stiff annular case and a resilient annular seal. The case has an outer peripheral edge and an inner peripheral edge. The seal has an outer peripheral rim and an inner peripheral rim. One of the peripheral rims of the seal is sealingly connected to one of the peripheral edges of the case and the other peripheral rim (or lip) of the seal extends radially from the case for resiliently radially sealing against a first surface, such as a shaft or shaft housing, spaced radially from the case. An intermediate rim (or lip) extends axially from the body of the seal relative to the seal and case for resiliently axially sealing against a second surface, such as the outside surface of an antifriction device, located axially adjacent the case and extending between the first surface and the case.

It is an advantage of the present invention to provide a seal assembly which seals on the outside face of an antifriction bearing and eliminates metal-to-metal contact between the seal assembly and the bearing face thereby eliminating metal chips and fragmentation produced by metal-to-metal contact.

It is an advantage of the present invention to provide a seal assembly having a resilient annular seal which resiliently radially seals against the housing for an antifriction bearing to prevent material from outside the seal assembly from entering the bearing; and which resiliently axially seals against the outside surface of the antifriction bearing to retain fluids, such as lubricants, within the bearing; and which will resiliently flex under pressure from within the bearing to allow excess fluid or lubricant to purge from the bearing.

It is an advantage of the present invention to provide a seal assembly having the above-mentioned advantages which will allow up to three degrees of axial misalignment between the antifriction bearing and the seal assembly without damage to the assembly while retaining the sealing and pressure relieving characteristics of the seal assembly.

It is an advantage of the present invention to provide a seal assembly having the above-mentioned advantages which can be used with deep-grooved ball bearings, double-row ball bearings, maxtype ball bearings, self-aligning ball bearings, angular contact ball bearings, cylindrical-roller bearings, spherical-roller bearings, and bearings that already contain integral seals or shields.

It is an advantage of the present invention to provide a seal assembly having the above-mentioned advantages which requires no modification to the antifriction bearing or to the members separated by the bearing in order to accommodate the seal assembly.

It is an advantage of the present invention to provide a seal assembly having a resilient annular seal which resiliently radially and axially seals against the housing for an antifriction bearing to prevent material from outside the seal assembly from entering the bearing; and which resiliently axially and radially seals against the outside surface of the antifriction bearing to retain fluids, such as lubricants, within the bearing; and which will resiliently flex under pressure from within the bearing to allow excess fluid or lubricant to purge from the bearing and return to its radial and axial sealing position after such purging.

BRIEF DESCRIPTION OF THE DRAWINGS

The present invention will be better understood by reference to the examples of the following drawings:

FIG. 4 is a perspective view of another embodiment of the seal assembly of the present invention.

FIG. 5 is a sectional view along line 5—5 of FIG. 4.

FIG. 6 is a cross-sectional view of the seal assembly of FIG. 4 installed with an antifriction bearing between two relatively rotatable members.

FIG. 8 is a partial cross-sectional view of another embodiment of the seal assembly of the present invention.

FIG. 9 is a partial cross-sectional view of another embodiment of the seal assembly of the present invention.

DETAILED DESCRIPTION OF THE PREFERRED EMBODIMENTS

Figure 1:
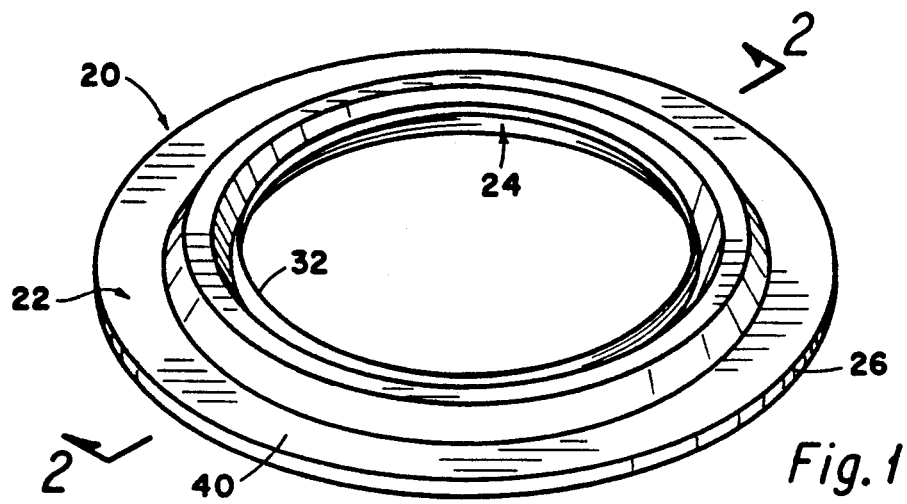
FIG. 1 is a perspective view of one embodiment of the seal assembly of the present invention.

Before explaining the present invention in detail, it is to be understood that the invention is not limited to the details of construction and arrangement of parts illustrated in the accompanying drawings, since the invention is capable of other embodiments and of being practiced and carried out in various ways commensurate with the claims herein. Also, it is to be understood that the terminology employed herein is for the purpose of description and not of limitation.

FIGS. 1 through 9 present a preferred embodiment of a seal assembly, generally designated 20, which exemplifies the present invention. Referring to the example of FIGS. 1 and 2, the invention may be described as being generally comprised of a stiff annular case 22 and a resilient annular seal 24. The annular case 22 has an outer peripheral edge 26 and an inner peripheral edge 28. The seal 24 has an outer peripheral rim (or lip) 30, an inner peripheral rim (or lip) 32, and an intermediate rim (or lip) 34. One of the peripheral rims 30, 32 of the seal is connected to one of the peripheral edges 26, 28 of the case. The other peripheral rim 30, 32 of the seal extends radially from the case 22 for resiliently radially sealing against a first surface 36, best seen in FIG. 3, spaced radially from the case 22. The intermediate rim 34 of the seal 24 extends axially relative to the seal 24 and case 22 for resiliently axially sealing against a second surface 38, as exemplified in FIG. 3, located axially adjacent and between the first surface 36 and the case 22. For purposes of describing and claiming this invention, the word axial or axially is used to define a direction or orientation parallel or coaxial with the major axis 39 of the annular case 22 and/or annular seal 24. The word radially is used to define a direction or orientation which is parallel or coplanar with a radial plane of the major axis 39 of the annular case 22 and/or annular seal 24.

There are two general configurations of the case 22 and seal 24. In the first configuration, referring to FIGS. 1–3, the outer peripheral rim 30 of the seal 24 is connected to the inner peripheral edge 28 of the case 22. In the second configuration, referring to FIGS. 4–6, the inner peripheral rim 32 of the seal 24 is connected to the outer peripheral edge 26 of the case 22. These configurations are discussed in greater detail, infra.

Figure 2:
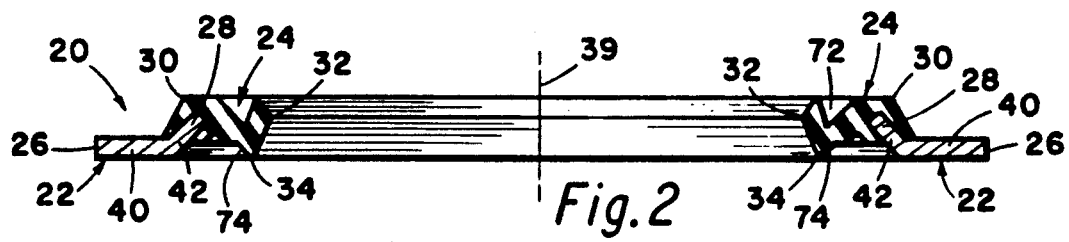
FIG. 2 is a sectional view along line 2—2 of FIG. 1.

Referring to FIGS. 2 and 5, in the preferred embodiment, the case 22 comprises a radial flange 40 and a skewed flange 42. The skewed flange 42 forms an obtuse angle with the radial flange 40. The annular seal 24 is connected to the peripheral edge 26, 28 of the case 22 which adjoins the skewed flange 42.

The preferred embodiment of the seal assembly 20 is used for sealing a cavity 44 formed between radially-spaced, coaxially-disposed, relatively-rotatable inner and outer members 46, 48 which have an antifriction device 50 coaxially-disposed between them. Typically, the inner member 46 is an axle or shaft, the outer member 48 is the housing surrounding the shaft 46, and the antifriction device 50 is an antifriction bearing used to rotatably space the inner and outer members 46, 48 and to reduce the frictional resistance to rotation between the members 46, 48, such as a ball bearing or roller bearing, as exemplified in FIGS. 3 and 6. Normally, either the inner member 46 or the outer member 48 is stationary and the other member 46, 48 rotates relative to the stationary member. The peripheral edge 26, 28 of the case 22 which is free, i.e., the peripheral edge 26, 28 which is not connected to the seal 24, is usually connected or secured against the stationary member 46, 48 although the seal assembly 20 may be used in a situation where both members 46, 48 rotate and the free peripheral edge 26, 28 of the case 22 may be secured against the rotating member 46, 48.

EMBODIMENTS OF FIGS. 1–3

Figure 3:
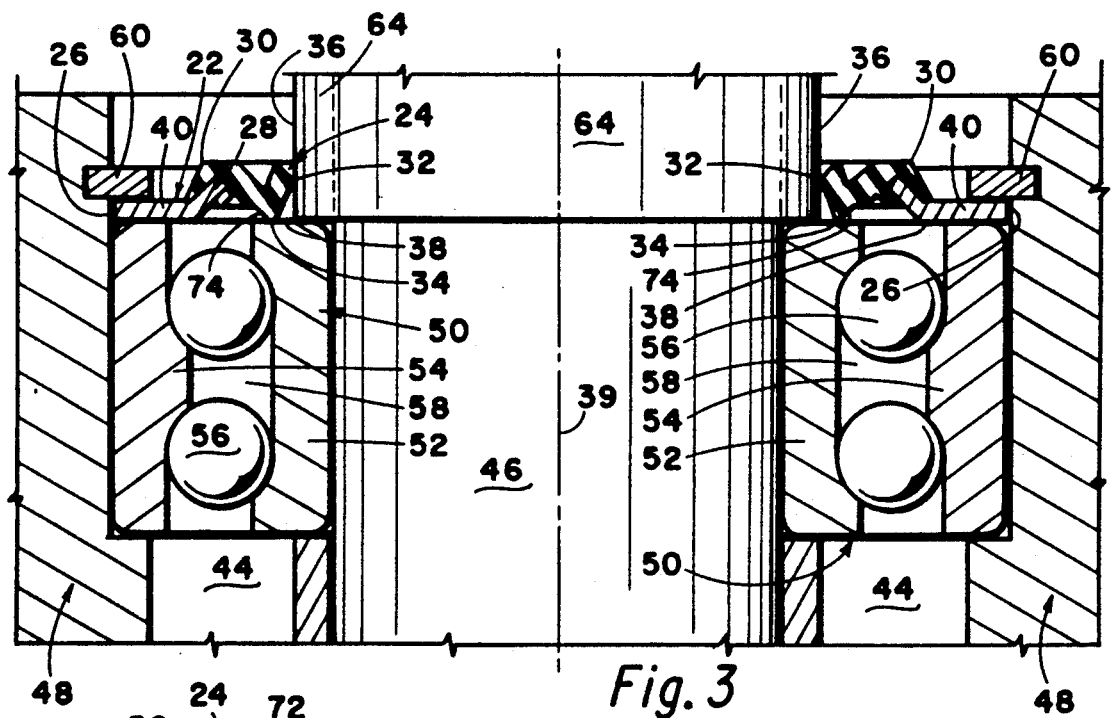
FIG. 3 is a cross-sectional view of the seal assembly of FIG. 1 installed with an antifriction bearing between two relatively rotatable members.

Referring to FIGS. 2 and 3, in the first configuration of the case 22 and seal 24, the outer peripheral edge 26 of the case 22 is releasably fastened between the antifriction device 50 and the outer member 48 or a protuberance of the outer member 48, as further discussed infra. The outer peripheral rim 30 of the seal 24 is connected to the inner peripheral edge 28 of the case 22. The outer peripheral rim 30 of the seal 24 should be continuously, sealingly connected to the inner peripheral edge 28 of the case 22. Preferably, the outer peripheral rim 30 of the seal 24 is adhesively bonded to the inner peripheral edge 28 of the case 22.

The inner peripheral rim 32 of the seal 24 extends radially from the case 22 for resiliently radially sealing against the first surface 36, which is provided by inner member 46. Preferably, the case 22 and seal 24 are generally coaxial and the radial planes of the case 22 and seal 24 are generally parallel. In the preferred embodiment, the case 22 and seal 24 are coaxial.

The intermediate rim 34 extends axially relative to the seal 24 and the case 22 and resiliently axially seals against the second surface 38. In the preferred embodiment, the second surface 38 is the outside surface, also designated 38, of the antifriction device 50. Preferably, the intermediate rim 34 axially seals against a radially planar portion of the outside surface 38.

As seen in FIGS. 2 and 3, in the preferred embodiment the intermediate rim 34 is an axial projection of the seal 24. The intermediate rim 34 and inner peripheral rim 32 can be made as independent or separate appendages extending from the outer peripheral rim 30 and the body of the seal 24. Preferably, the intermediate rim 34, outer peripheral rim 30, and inner peripheral rim 32 are integral to the basic cross-sectional shape of the seal 24, as exemplified in FIGS. 2 and 3, and do not require separate appendages or extensions from the seal 24 in order to reduce the cost of the seal assembly 20 and to enhance the "memory" of the seal 24, i.e., the seal's ability to return to and retain its normal shape and sealing with the surface 36 of inner member 46 and surface 38 of antifriction device 50.

Normally, the cavity 44 contains a fluid, e.g., grease, lubricating oil, etc. and the intermediate rim 34 of the seal 24 seals the fluid in the cavity 44. The intermediate rim 34 and the seal 24 resiliently flex to relieve pressure from the cavity 44, i.e., if pressure builds in the cavity 44 due to excessive expansion of the fluid, excessive compression of the fluid, addition of too much pressurized grease to the cavity 44, etc., the intermediate rim 34 and seal 24 will resiliently flex to allow the pressurized fluid to flow from the cavity 44. Similarly, the inner peripheral rim 32 and seal 24 will resiliently flex to allow pressurized fluid to flow from the cavity 44. The inner peripheral rim 32 also seals against the inner member 46 to prevent flow of foreign material from outside of the cavity 44 into the cavity 44.

The exact shape of the inner peripheral rim 32 and intermediate rim 34 is not critical. The shape of the rims 32, 34 should provide sufficient area to form a good contact and seal with the surface 36 of the inner member 46 and antifriction device 50 and should be small enough to allow the rims 32, 34 and seal 24 to flex and relieve fluid overpressure within the cavity 44 without undue restrictive interference with the inner member 46 and antifriction device 50.

As discussed supra, in the preferred embodiment, the antifriction device 50 is an antifriction bearing, such as a roller bearing, ball bearing, etc. The antifriction bearing 50 has an inner bearing ring 52, an outer bearing ring 54, and antifriction elements 56. The outer bearing ring is concentrically and coaxially arranged with the inner bearing ring 52 to form an annular bearing chamber 58 between the inner bearing ring 52 and the outer bearing ring 54. The inner and outer bearing rings 52, 54 are rotatable relative to one another. The intermediate rim 34 should seal against a surface between the chamber 58 and the inner member 46 for the seal assembly 20 to properly function. In the embodiment of FIG. 3, the intermediate rim 34 resiliently axially seals against the outside surface 38 of the inner bearing ring 52, which allows the intermediate rim 34 to seal both the chamber 58 and the cavity 44.

In the embodiment of FIGS. 1-3, the skewed flange 42 of the case 22 adjoins the inner peripheral edge 28 of the case 22. The skewed flange 42 extends the inner peripheral edge 28 of the case 22 axially away from the antifriction device 50. This orientation of the skewed flange 42 also extends the outer peripheral rim 30 of the seal 24 away from the antifriction device 50 and creates a spacing between the outer peripheral rim 30 and the antifriction device 50 conducive to the resilient axial sealing and pressure relieving between the intermediate rim 34 and the antifriction device 50, as further discussed infra.

In the preferred embodiment of FIG. 3, the outer peripheral edge 26 of the case 22 is frictionally engageable between the antifriction device 50 and a protuberance 60 from the outer member 48. The protuberance 60 typically is a shoulder as is commonly provided in housings for axles and shafts as a means for retaining an antifriction bearing 50 between the housing 48 and shaft 46. In the example of FIG. 3, the protuberance 60 is a snap ring.

As exemplified in FIG. 3, in the preferred embodiment the radial flange 40 of the case 22 is held or clamped between the protuberance 60 and the outside surface 38 of outer bearing ring 54 of the antifriction device 50. Since the radial flange 40 is flat against the outside surface 38 of the antifriction device, the skewed flange 42 extends the outer peripheral rim 30 of the seal 24 away from the antifriction device 50 which gives clearance between the case 22 and bearing chamber 58 to allow the fluid pressure to escape from the chamber 58. The skewed flange 42 also gives a stiffness to the case 22 which helps retain the radially planar, annular shape of the case 22 and gives a stiffness or resistance to the seal 24 which is important in establishing the resilient axial sealing between the intermediate rim 34 and the inner bearing ring 52 and in establishing the resilient radial sealing between the inner peripheral rim 32 and the surface 36 of inner member 46. It is this resilient radial and axial sealing which gives the seal assembly 20 its ability to retain fluid within the cavity 44 and bearing chamber 58, to relieve excessive pressure from the cavity 44 and bearing chamber 58, and to exclude or prevent the entry of outside materials and contaminants into the cavity 44 and chamber 58.

The stiffness imparted to the seal 24 by the skewed flange 42 also increases the resistance of the seal 24 to relieving pressure and fluid from the cavity 44 and bearing chamber 58. There should be sufficient resistance to the fluid pressure to keep the cavity 44 and bearing chamber 58 full of fluid, e.g., to retain fluid pressure that is a result of fluid expansion at normal operating temperatures. If the pressure resistance of the seal assembly 20 is too weak, fluid/lubricant will escape at normal operating temperatures and when the antifriction device 50 is cool the fluid will contract leaving dry areas in the device 50.

The seal assembly 20 can also be constructed with a case 22 having only a radial flange 40, although this would require that either the radial flange 40 be spaced away from the outside surface 38 of the antifriction device 50 in order to provide the clearance provided by the skewed flange 42 between the bearing chamber 58 and the case 22 or the radial length of the radial flange 40 would have to be reduced to the extent that the radial flange 40 did not extend over the bearing chamber 58. The preferred embodiment of the seal assembly 20 having the skewed flange 42 should hold its shape better and provide better sealing and pressure relieving qualities.

The seal assembly 20 should be sized to provide axial interference between the intermediate rim 34 and the antifriction device 50 in the installed position of the seal assembly 20, illustrated in FIG. 3. By axial interference is meant that the intermediate rim 34 should extend further than necessary to contact the antifriction device 50, thereby creating interference between the intermediate rim 34 and the antifriction device 50. The amount of axial interference needed will vary with the type of antifriction device 50. If the antifriction device is a roller or ball bearing, there should be at least .020 (twenty-thousandths) inch axial interference. If the antifriction device 50 is a self-aligning bearing, such as a spherical roller bearing, as a rule of thumb there should be at least 0.017 (seventeen-thousandths) inch interference for each inch of diameter of the bearing and for each degree of anticipated axial misalignment (deviation from coaxial alignment) between the seal assembly 20 and the antifriction device 50. For example, if the seal assembly 20 is one inch in diameter and it is desired to allow for two degrees of axial misalignment, the seal assembly 20 should be sized to provide at least 0.034 inch of axial interference between the intermediate rim 34 and the antifriction device 50 (0.034 inch=0.017 inch interference per inch diameter per degree misalignment-×one inch diameter×two degrees misalignment). The additional axial interference for self-aligning bearings is needed to allow axial misalignment between the seal assembly 20 and the self-aligning bearing 50 without damage to the seal assembly 20 and to allow the coaxial misalignment while retaining the abilities of the seal assembly 20 to retain fluid within the cavity 44 and bearing chamber 58, to relieve excess pressure from the cavity 44 and bearing chamber 58, and to exclude or prevent the entry of outside materials and contaminants into the cavity 44 and chamber 58 from outside of the seal assembly 20.

Referring to FIG. 3, normally the inner peripheral rim 32 of seal 24 will seal against a first surface 36 on the inner member 46. Preferably, the first surface 36 is some form of shoulder 64 extending radially outward from the inner member 46. Typically, the shoulder 64 is some form of collar or retaining ring which is used to hold or secure the antifriction bearing 50 in the cavity 44. If the shoulder 64 or retaining ring is not present, or if a different type of device which does not provide a shoulder 64, such as a relatively small snap ring, is used to secure the antifriction bearing 50, the inner peripheral rim 32 of the seal 24 can seal against the surface of the inner member 46. Adjustments in the size of the seal assembly 20, i.e., the radial width of the case 22 and seal 24 should be made to accommodate the presence or absence of shoulder 64. It is recommended that the inner peripheral rim 32 extend approximately 0.060 inch (sixty-thousandths) inch further than is necessary to contact the shoulder 64 to provide adequate sealing, i.e., there should be 0.060 (sixty-thousandths) inch radial interference between the inner peripheral rim 32 and the surface 36 of shoulder 64.

EMBODIMENT OF FIGS. 4-6.

Referring to FIGS. 4-6, in the second configuration of the case 22 and seal 24, the inner peripheral edge 28 of the case 22 is releasably fastened between the antifriction device 50 and the inner member 46 or a protuberance of the inner member 46, as further discussed infra. The inner peripheral rim 32 of the seal 24 is connected to the outer peripheral edge 26 of the case 22. The inner peripheral rim 32 of the seal 24 should be continuously, sealingly connected to the outer peripheral edge 26 of the case 22. In the preferred embodiment, the seal 24 is adhesively bonded to the case 22.

The outer peripheral rim 30 of the seal 24 extends radially from the case 22 for resiliently radially sealing against the first surface 36, which is provided by outer member 48. Preferably, the case 22 and seal 24 are generally coaxial and the radial planes of the case 22 and seal 24 are generally parallel. In the preferred embodiment, the case 22 and seal 24 are coaxial.

The intermediate rim 34 extends axially relative to the seal 24 and the case 22 and resiliently axially seals against the second surface 38. In the preferred embodiment, the second surface 38 is the outside surface, also designated 38, of the antifriction device 50. Preferably, the intermediate rim 34 axially seals against a radially planar portion of the outside surface 38.

As seen in FIGS. 5 and 6, in the preferred embodiment the intermediate rim 34 is an axial projection of the seal 24. The intermediate rim 34 and outer peripheral rim 30 may be made as independent or separate appendages from the outer peripheral rim 30 and body or seal 24. Preferably, the intermediate rim 34, outer peripheral rim 30, and inner peripheral rim 32 are integral to the basic cross-sectional shape of the seal 24, as exemplified in FIGS. 5 and 6, and do not require separate appendages or extensions from the seal 24 in order to reduce the cost of the seal and enhance the "memory" of the seal 24, i.e., the seal's ability to return to and retain it's normal shape and sealing with the surface 36 of outer member 48 and surface 38 of antifriction device 50.

Normally, the cavity 44 contains a fluid, e.g., grease, lubricant oil, etc. and the intermediate rim 34 of the seal 24 seals the fluid in the cavity 44. The intermediate rim 34 and the seal 24 resiliently flex to relieve pressure from the cavity 44, i.e., if the pressure builds in the cavity 44 due to excessive expansion of the fluid, excessive compression of the fluid, addition of too much pressurized grease to the cavity 44, etc. the intermediate rim 34 and seal 24 will resiliently flex to allow the presurized fluid to flow from the cavity 44. Similarly, the outer peripheral rim 30 and seal 24 will resiliently flex to allow pressurized fluid to flow from the cavity 44. The outer peripheral rim 30 also seals against the surface 36 of outer member 48 to prevent flow of foreign material from outside of the cavity 44 into the cavity 44.

The exact shape of the outer peripheral rim 30 and intermediate rim 34 is not critical. The shape of the rim 30, 34 should provide sufficient area to form a good contact and seal with the surface 36 of outer member 48 and antifriction device 50 and should be small enough to allow the rims 30, 34 and seal 24 to flex and relieve overpressure within cavity 44 without undue restrictive interference with the outer member 48 and antifriction device 50.

As discussed supra, in the preferred embodiment, the antifriction device 50 is an antifriction bearing, such as a ball bearing, roller bearing, etc. Typically, the antifriction bearing 50 has an inner bearing ring 52, an outer bearing ring 54, and antifriction elements 56. The outer bearing ring 54 is concentrically and coaxially arranged with the inner bearing ring 52 to form an annular bearing chamber 58 between the inner bearing ring 52 and the outer bearing ring 54. The inner and outer bearing rings 52, 54 are rotatable relative to one another. The intermediate rim 34 should seal against a surface between the chamber 58 and the outer member 48 for the seal assembly 20 to properly function. In the embodiment of FIG. 6, the intermediate rim 34 resiliently axially seals against the outside surface 38 of the outer bearing ring 54, which allows the intermediate rim 34 to seal both the chamber 58 and the cavity 44.

Referring to the example of FIGS. 5 and 6, the skewed flange 42 of the case 22 adjoins the outer peripheral edge 26 of the case 22. The skewed flange 42 extends the outer peripheral edge 26 of the case 22 axially away from the antifriction device 50. This orientation of the skewed flange 42 also extends the inner peripheral rim 32 of the seal 24 away from the antifriction device 50 and creates a spacing between the inner peripheral rim 32 and the antifriction device 50 conducive to the resilient axial sealing and pressure relieving between the intermediate rim 34 and the antifriction device 50, as further discussed infra.

Referring to the example of FIG. 6, the inner peripheral edge 28 of the case 22 is frictionally engageable between the antifriction device 50 and a protuberance 64 from the inner member 46. The protuberance 64 typically is a collar or shoulder as is commonly provided on axles and shafts as a means for retaining an antifriction bearing 50 between the housing 48 and shaft 46.

As exemplified in FIG. 6, in the preferred embodiment, the radial flange 40 of the case 22 is held or clamped between the protuberance 64 and the outside surface 38 of inner bearing ring 52 of the antifriction device 50. The skewed flange 42 extends the inner peripheral rim 32 of the seal 24 away from the antifriction device 50 which gives clearance between the case 22 and bearing chamber 58 to allow the fluid pressure to escape from the chamber 58. The skewed flange 42 also gives a stiffness to the case 22 which helps retain the radially planar, annular shape of the case 22 and gives a stiffness to the seal 24 which is important in establishing the resilient axial sealing between the intermediate rim 34 and the outer bearing ring 54 and in establishing the resilient radial sealing between the outer peripheral rim 30 and the surface 36 of outer member 48. It is this resilient radial and axial sealing which gives the seal assembly 20 its ability to retain fluid within the cavity 44 and bearing chamber 58 to relieve excess pressure from the cavity 44 and bearing chamber 58, and to exclude or prevent the entry of outside materials and contaminants into the cavity 44 and chamber 58.

The stiffness imparted to the seal 24 by the skewed flange 42 also increases the resistance of the seal 24 to relieving pressure and fluid from cavity 44 and bearing chamber 58. There should be sufficient resistance to the fluid pressure to keep the cavity 44 and bearing chamber 58 full of fluid, e.g., to retain fluid pressure that is a result of fluid expansion at normal operating temperatures. If the pressure resistance of the seal assembly 20 is too weak, fluid/lubricant will escape at normal operating temperatures and when the antifriction device 50 cools the fluid will contract leaving dry unlubricated areas in the antifriction device 50.

The seal assembly 20 can also be constructed with a case 22 having only a radial flange 40, although this would require that either the radial flange 40 be spaced away from the outside surface 38 of the antifriction device 50 in order to provide the clearance provided by the skewed flange 42 between the bearing chamber 58 and the case 22 or the radial length of the radial flange 40 would have to be reduced to the extent that the radial flange 40 did not extend over the bearing chamber 58. In any event, it is felt that the seal assembly 20 having the skewed flange 42 will hold its shape better and provide better sealing and pressure relieving qualities.

The seal assembly 20 should be sized to provide axial interference between the intermediate rim 34 and the antifriction device 50 in the installed position of the seal assembly 20, illustrated in FIG. 6. By axial interference is meant that the intermediate rim 34 should extend farther than necessary to contact the antifriction device 50, thereby creating interference between the intermediate rim 34 and the antifriction device 50. The amount of axial interference needed will vary with the type of antifriction device. If the antifriction device 50 is a roller or ball bearing, there should be at least 0.020 (twenty-thousandths) inch axial interference. If the antifriction device 50 is a self-aligning bearing, such as a spherical roller bearing, as a rule of thumb, there should be at least 0.017 (seventeen-thousandths) inch interference per each inch of diameter of the bearing and for each degree of an anticipated axial misalignment (deviation from coaxial alignment) between the seal assembly 20 and the antifriction device 50. For example, if the seal assembly 20 is one and one-half inches in diameter and it is desired to allow for two degrees of axial misalignment, the seal assembly 20 should be sized to provide at least 0.051 (fifty-one-thousandths) inch of axial interference between the intermediate rim 34 and the antifriction device 50 (0.051 inch=0.017 inch interference per inch diameter per degree misalignment×1.5 inch diameter×two degrees misalignment). The additional axial interference for self-aligning bearings is needed to allow axial misalignment between the seal assembly 20 and the self-bearing 50 without damage to the seal assembly 20 and to allow the axial misalignment while retaining the abilities of the seal assembly 20 to retain fluid within the cavity 44 and bearing chamber 58, to relieve excess pressure from the cavity 44 and bearing chamber 58, and to exclude or prevent the entry of outside materials and contaminants into the cavity 44 and chamber 58 from outside of the seal assembly 20.

Referring to FIG. 6, normally the outer peripheral rim 30 of seal 24 will seal against a first surface 36 on the outer member 48. Preferably, the first surface 36 is some form of shoulder 60 extending radially inward from the outer member 48. Typically, the shoulder 60 is some form of collar or retaining ring which is used to hold or secure the antifriction bearing 50 in the cavity 44. If the shoulder 60 or retaining ring is not present, or if a different type of device which does not provide a shoulder 60, such as a relatively small snap ring, is used to secure the antifriction bearing 50, the outer peripheral rim 30 of the seal 24 can seal against the outer member 48. Adjustments in the size of the seal assembly 20, i.e., the radial width of the case 22 and seal 24 should be made to accommodate the presence or absence of shoulder 60. It is recommended that the outer peripheral rim 30 extend approximately 0.060 inch (sixty thousandths of an inch) further than is necessary to contact the shoulder 60 to provide adequate sealing, i.e., there should be 0.060 (sixty-thousandths) inch radial interference between the outer peripheral rim 30 and the surface 36 of shoulder 60.

ADDITIONAL DESCRIPTION OF PREFERRED EMBODIMENTS

The seal 24 may take virtually any shape which provides the two peripheral rims 30, 32 and the intermediate rim 34 and which will provide the resilient sealing discussed above. As discussed supra, the "sealing" peripheral rim 30, 32 (the peripheral rim 30, 32 which extends radially away from the case 22) should resiliently radially seal against the first surface 36 of the inner or outer member 46, 48 (depending on whether the case 22 and seal 24 configuration of FIGS. 1-3 or FIGS. 4-6 is in use). The "sealing" peripheral rim 30, 32 also should axially seal against the inner or outer member 46, 48 to prevent the flow of foreign material and contaminants from outside the seal 24 and cavity 44 between the sealing rim 30, 32 and member 46, 48 into the cavity 44 and bearing chamber 58. The "sealing" peripheral rim 30, 32 should be sufficiently radially and axially flexible and resilient to allow flow of pressurized fluid out of the cavity 44 and chamber 58 and to return to the radially and axially sealing position when the pressurized fluid flow has been relieved. The intermediate rim 34 should axially seal against the second surface 38, which is normally the outside surface 38 of antifriction device 50. The intermediate rim 34 should seal against both axial and radial flow of fluid into and out of the cavity 44 under normal conditions and should be resilient enough to relieve excessive fluid pressure from within the cavity 44 and chamber 58, i.e., the intermediate rim 34 and seal 24 should yield axially and radially to excessive fluid pressure in order to allow fluid flow out of the cavity 44 and chamber 58 and should resume its axially and radially sealing position when sufficient fluid has escaped to reduce the pressure within the cavity 44 and chamber 58 to an acceptable level.

Figure 7:
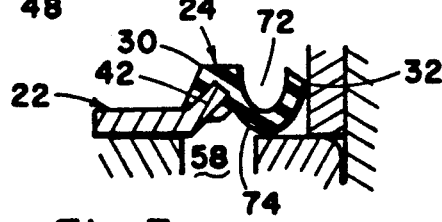
FIG. 7 is a partial cross-sectional view of another embodiment of the seal assembly of the present invention.

Referring to FIGS. 7-9, the seal 24 may be generally U-shaped (or channel-shaped) in transverse cross-section, in which case the outer peripheral rim 30 of the seal 24 would be the free end of one leg of the seal, the inner peripheral rim 32 of the seal 24 would be the free end of the other leg of the seal, and the intermediate rim 34 would be the apex of the seal. In any cross-sectional shape of the seal 24, but particularly if the seal 24 is U-shaped or channel-shaped, the seal 24 should incline from the point of contact with the inner or outer member 46, 48 towards the intermediate rim 34 creating a space 70 between the seal 24 and the inner or outer members 46, 48. For purposes of discussing FIGS. 7-9, the "sealing" peripheral rim 30, 32 which seals against the inner or outer member 46, 48 (depending upon which configuration of the case 22 and seal 24 is in use) is the inner peripheral rim 32, i.e., the configuration of FIGS. 1-3 is used. The inclination and space 70 allow the "sealing" rim 32 to virtually function as a one-way valve or check valve in that the inclination and space 70 encourages or facilitates fluid flow from inside the seal 24 and bearing chamber 58 out of the chamber 58 but are resistant to flow of fluid or contaminants from outside of the seal 24 into the chamber 58.

Referring to FIG. 8, the seal may be generally diamond-shaped in transverse cross-section with the outer peripheral rim 30 of the seal 24 being a first apex of the diamond-shaped seal, the inner peripheral rim 32 of the seal 24 being a second apex of the diamond shaped seal diametrically opposite the first apex, and the intermediate rim 34 of the seal 24 being a third apex of the diamond shaped seal.

Similarly, referring to FIG. 9, the seal 24 may be generally circular in transverse cross-section with the peripheral rims 30, 32 and intermediate rim 34 being points on the surface of the circular shape.

Preferably, the seal 24 is generally V-shaped in transverse cross-section, as exemplified in FIGS. 1-6, with the outer peripheral rim 30 being the free end of one leg of the V-shaped seal, the inner peripheral rim 32 of the seal 24 being the free end of the other leg of the V-shaped seal, and the intermediate rim 34 being the apex of the V-shaped seal. The V-shape provides good axial and radial resilience and sealing in the peripheral rim 30, 32 which is contact with the inner member 46 or outer member 48 (depending upon which configuration of the case 22 and seal 24 is in use) and also provides good axial and radial resilience and sealing in the intermediate rim 34.

Any of the cross-sectional shapes of the seal 24 discussed supra may be solid in cross-section although the inventor has found that the "hollow" cross-sectional shapes, i.e., a literal circle, channel, "U", or "V" with hollow central section 72, provides the best resilience and sealing.

In all of the cross-sectional shapes of seal 24 discussed supra, i.e., U-shaped, channel-shaped, diamond-shaped, circle-shaped, and V-shaped, the peripheral and intermediate rims 30, 32, 34 are an inherent feature of the shape which does not require peninsular appendages to effect the sealing contact with the surface 36 of inner or outer member 46, 48 and antifriction device 50. The sealing is an inherent effect of the shape when properly sized in conjunction with the case 22. The shape enhances the memory of the resilient material and thereby enhances the propensity of the seal 24 to return to its original shape and to its resilient radial and axial sealing with the inner or outer member 46, 48 and antifriction bearing 50. This enhanced tendency of the seal 24 to return to its sealing position in combination with the extension of the skewed flange 42 over the bearing chamber 58 of the antifriction bearing 50, as best seen in FIGS. 3 and 6, give the seal assembly 20 its ability to relieve excessive pressure from within the bearing chamber and to provide a good lubricant retaining seal and foreign matter excluding seal, both before and after relieving excessive pressure. The extension of the skewed flange 42 of the case 22 at least partially over the bearing chamber 58 directs the flow of pressurized fluid from the bearing chamber 58 against an inside face 74 of the seal 24 and therefore naturally displaces the seal 24 and allows escape of pressurized fluid. Once the pressurized fluid has escaped, the skewed flange 42 gives stiffness to the seal 24 which enhances the resilient return of the seal 24 to its natural shape and inherent sealing. Any attempt of fluid or lubricant to flow from outside the seal to inside the bearing chamber 58 urges the seal 24 into its normal position in which the intermediate rim 34 seals against the antifriction device 50 and the peripheral rim 30, 32 seals against the inner or outer member 46, 48. The seal assembly 20 functions analogously to a check-valve or a one-way valve which will permit pressurized fluid flow from the bearing chamber 58 and cavity 44 to the outside of the seal and will not permit fluid flow in the reverse direction. The "hollow" cross-sectional shapes of the seal 24 discussed supra, particularly the channel, U, and V-shapes, enhance this check valve type functioning in that the hollow central section 72 of the channel, U, and V-shapes tends to catch any flow of fluid from outside the seal 24 toward the inside of the bearing chamber 58 forcing the intermediate rim 34 and peripheral rim 30 or 32 into sealing contact with the appropriate surface.

The skewed flange 42 of case 22 may be provided by seal 24, i.e., the case 22 may be simply a radial flange and the skewed flange 42 may be a reinforced portion of the seal 24. If the skewed flange 42 is part of the seal 24, the flange 42 should be sufficiently stiff in cooperation with the remainder of the seal 24 to provide the resilient axial and radial sealing discussed supra. Regardless of whether the skewed flange 42 is part of the case 22 or the seal 24 the skewed flange 42 may take virtually any shape or angle with respect to the radial flange 40 and seal 24 which will provide the stiffness and allow the axial and radial resilience and sealing discussed supra. For example, the skewed flange 42 may have an annular flange, either skewed or radial, (not illustrated) extending from the peripheral edge 26, 28 adjoining the skewed flange; or may have an annular flange which has a peripheral edge connected to the peripheral edge adjoining the skewed flange 42 and a peripheral edge attached to a second skewed flange (not illustrated). Preferably the skewed flange 42 takes the obtuse shape illustrated in FIGS. 1-9.

MATERIALS

Preferably, the case 22 is made of steel, stainless steel, polymer, or equivalent metal-like material. In the preferred embodiment, the case 22 is made of cold rolled, mild (low carbon) steel. Preferably, the seal 24 is made of Viton ®, silicon, resilient polymer, or equivalent elastic-like material. In the preferred embodiment, the seal 24 is made of nitrile rubber.

While the invention has been described with a certain degree of particularity, it is manifest that many changes may be made in the details of construction and the arrangement of components without departing from the spirit and scope of this disclosure. It is to be understood that the invention is not limited to the embodiments set forth herein for purposes of exemplification, but is to be limited only by the scope of the attached claim or claims, including the full range of equivalency to which each element thereof is entitled.

What is claimed is:

1. A seal assembly for sealing a cavity formed between radially-spaced, coaxially disposed, relatively-rotatable inner and outer members having an antifriction device coaxially disposed between the inner and outer members; the antifriction device having radially spaced, coaxially-disposed, relatively-rotatable inner and outer rings spaced apart by antifriction elements, the inner and outer rings having end faces at each axial end of the antifriction device; the seal assembly comprising:

a stiff case of endless annular shape comprising a radial flange having a peripheral edge and a skewed flange having a peripheral edge, the skewed flange being connected to and forming an obtuse angle with the radial flange, the radial flange being connectable between a protuberance located juxtaposed a respective axially adjacent ring end face of the antifriction device and extending from one of the outer member and the inner member, the protuberance axially restraining the antifriction device so that the radial flange is axially supported by the axially adjacent ring end face and held between the protuberance and the axially adjacent ring end face with the skewed flange extending axially away from the antifriction device and radially away from the radial flange; and a resilient seal of endless annular shape, the annular seal including:
an outer peripheral rim and an inner peripheral rim, one peripheral rim being sealingly connected to the skewed flange in such a manner that at least an annular portion of the radial flange axially coincident with the axially adjacent ring end face and contiguous with the peripheral edge of the radial flange is not resiliently covered by the resilient seal, the other peripheral rim extending radially from the case for resiliently radially sealing against a first surface spaced radially from the case; and
an intermediate rim extending axially relative to the seal and the case for resiliently axially sealing against an end face of the one of the inner and outer ring which is not axially supporting the radial flange.

2. The seal assembly of claim 1:
wherein the outer peripheral rim of the seal is connected to the skewed flange of the case.

3. The seal assembly of claim 1:
wherein the inner peripheral rim of the seal is connected to the skewed flange of the case.

4. The seal assembly of claim 1:
wherein the seal is generally V-shaped in transverse cross-section;
wherein the outer peripheral rim of the seal is the free-end of one leg of the V-shaped seal;
wherein the inner peripheral rim of the seal is the free-end of the other leg of the V-shaped seal; and
wherein the intermediate rim is the apex of the V-shaped seal.

5. The seal assembly of claim 1:
wherein the seal is generally U-shaped in transverse cross-section;
wherein the outer peripheral rim of the seal is the free-end of one leg of the U-shaped seal;
wherein the inner peripheral rim of the seal is the free-end of the other leg of the U-shaped seal; and
wherein the intermediate rim is the apex of the U-shaped seal.

6. The seal assembly of claim 1:
wherein the seal is generally diamond-shaped in transverse cross-section;
wherein the outer peripheral rim of the seal is a first apex of the diamond-shaped seal;
wherein the inner peripheral rim of the seal is a second apex of the diamond-shaped seal; and
wherein the intermediate rim of the seal is a third apex of the diamond-shaped seal.

7. The seal assembly of claim 1:
wherein the seal is generally circular in transverse cross-section.

8. A seal assembly for sealing a cavity formed between radially-spaced, coaxially disposed, relatively-rotatable inner and outer members having an antifriction device coaxially disposed between the inner and outer members; the antifriction device having radially-spaced, coaxially-disposed, relatively-rotatable inner and outer rings spaced apart by antifriction elements, the inner and outer rings having end faces at each axial end of the antifriction device; the seal assembly comprising:
a stiff case of endless annular shape comprising a radial flange having an outer peripheral edge and a skewed flange having an inner peripheral edge, the skewed flange being connected to and forming an obtuse angle with the radial flange, the outer peripheral edge being connectable between a protuberance extending from the outer member which axially restrains the antifriction device and the outer ring of the antifriction device so that the radial flange is axially supported by the outer ring end face and held between the protuberance and the outer ring end face with the skewed flange extending the inner peripheral edge axially away from the antifriction device and radially away from the radial flange; and
a resilient seal of endless annular shape, the seal including:
an inner peripheral rim and an outer peripheral rim, the the outer peripheral rim being sealingly connected to the inner peripheral edge of the case in such a manner that at least an annular portion of the radial flange axially coincident with the outer ring and contiguous with the outer peripheral edge is not resiliently covered by the outer peripheral rim, the inner peripheral rim extending radially from the case for resiliently radially sealing against a first surface connected to the inner member and spaced radially from the case; and
an intermediate rim extending axially relative to the seal and the case for resiliently axially sealing against the adjacent inner end face of the antifriction device.

9. The seal assembly of claim 8:
wherein the cavity contains fluid and the intermediate rim of the seal seals the fluid in the cavity; and
wherein the intermediate rim resiliently flexes to relieve pressurized fluid flow from the cavity; and
wherein the inner peripheral rim resiliently flexes to relieve pressurized fluid flow from the cavity; and
wherein the inner peripheral rim resiliently radially seals against the first surface of the inner member to prevent flow of foreign material from outside of the cavity into the cavity.

10. The seal assembly of claim 8:
wherein the outer peripheral edge of the case is frictionally engageable between the antifriction device and the protuberance from the outer member.

11. A seal assembly for sealing a cavity formed between radially-spaced, coaxially-disposed, relative-rotatable inner and outer members having an antifriction device coaxially disposed between the inner and outer members; the antifriction device having radially-spaced, coaxially-disposed, relatively-rotatable inner and outer rings spaced apart by antifriction elements, the inner and outer rings having end faces at each axial end of the antifriction device; the seal assembly comprising:
- a stiff case of endless annular shape comprising a radially flange having an inner peripheral edge and a skewed flange having an outer peripheral edge, the skewed flange being connected to and forming an obtuse angle with the radial flange, the inner peripheral edge being connectable between a protuberance extending from the inner member which axially restrains the antifriction device and the inner ring of the antifriction device so that the radial flange is axially supported by the inner ring end face and held between the protuberance and the inner ring end face with the skewed flange extending the outer peripheral edge axially away from the antifriction device and radially away from the radial flange; and
- a resilient seal of endless annular shape, the seal including:
  - an inner peripheral rim and an outer peripheral rim, the inner peripheral rim being sealingly connected to the outer peripheral edge of the case in such a manner that at least an annular portion of the radial flange axially coincident with the inner ring and contiguous with the inner peripheral edge is not resiliently covered by the inner peripheral rim, the outer peripheral rim extending radially from the case for resiliently radially sealing against a first surface connected to the outer member and spaced radially from the case; and
  - an intermediate rim extending axially relative to the seal and the case for resiliently axially sealing against the adjacent outer ring end face of the antifriction device.

12. The seal assembly of claim 11:
- wherein the cavity contains fluid and the intermediate rim of the seal seals the fluid in the cavity; and
- wherein the intermediate rim resiliently flexes to relieve pressurized fluid flow from the cavity; and
- wherein the outer peripheral rim resiliently flexes to relieve pressurized fluid flow from the cavity; and
- wherein the outer peripheral rim resiliently radially seals against the first surface of the outer member to prevent flow of foreign material from outside of the cavity into the cavity.

13. The seal assembly of claim 1:
- wherein the inner peripheral edge of the case is frictionally engageable between the antifriction device and the protuberance from the inner member.

14. A seal assembly for sealing a cavity formed between radially-spaced, coaxially-disposed, relatively-rotatable inner and outer members, the seal assembly comprising:
- an annular antifriction bearing coaxially disposed between the inner and the outer members, the antifriction bearing having radially-spaced, coaxially-disposed, relatively-rotatable inner and outer rings spaced apart by antifriction elements, the inner and outer rings having coplanar end faces at each axial end of the antifriction bearing;
- a stiff case of endless annular shape comprising a radial flange having an outer peripheral edge and a skewed flange having an inner peripheral edge, the skewed flange being connected to and forming an obtuse angle with the radial flange, the outer peripheral edge being connectable between a protuberance extending from the outer member which axially restrains the antifriction bearing and the outer ring of the antifriction bearing so that the radial flange is axially supported by the outer ring end face and held between the protuberance and the outer ring end face with the skewed flange extending the inner peripheral edge axially away from the antifriction bearing and radially away from the radial flange; and
- a resilient seal of endless annular shape, the seal including:
  - an inner peripheral rim and an outer peripheral rim, the the outer peripheral rim being sealingly connected to the inner peripheral edge of the case in such a manner that at least an annular portion of the radial flange axially coincident with the outer ring and contiguous with the outer peripheral edge is not resiliently covered by the outer peripheral rim, the inner peripheral rim extending radially from the case for resiliently radially sealing against a first surface connected to the inner member and spaced radially from the case; and
  - an intermediate rim extending axially relative to the seal and the case for resiliently axially sealing against the adjacent inner ring end face of the antifriction bearing.

15. A seal assembly for sealing a cavity formed between radially-spaced, coaxially-disposed, relatively-rotatable inner and outer members, the seal assembly comprising:
- an annular antifriction bearing coaxially disposed between the inner and the outer members, the antifriction bearing having radially-spaced, coaxially-disposed, relatively-rotatable inner and outer rings spaced apart by antifriction elements, the inner and outer rings having coplanar end faces at each axial end of the antifriction bearing;
- a stiff case of endless annular shape comprising a radial flange having an inner peripheral edge and a skewed flange having an outer peripheral edge, the skewed flange being connected to and forming an obtuse angle with the radial flange, the inner peripheral edge being connectable between a protuberance extending from the inner member which axially restrains the antifriction bearing and the inner ring of the antifriction bearing so that the radial flange is axially supported by the inner ring end face and held between the protuberance and the inner ring end face with the skewed flange extending the outer peripheral edge axially away from the antifriction bearing and radially away from the radial flange; and
- a resilient seal of endless annular shape, the seal including: an inner peripheral rim and an outer peripheral rim, the inner peripheral rim and an outer peripheral rim, the inner peripheral rim being sealingly connected to the outer peripheral edge of the case in such a manner that at least an annular portion of the radial flange axially coincident with the inner ring and contiguous with the inner peripheral edge is not resiliently covered by the inner peripheral rim, the outer peripheral rim extending radially from the case for resiliently radially sealing against a first surface connected to the outer member and spaced radially from the case; and
- an intermediate rim extending axially relative to the seal and the case for resiliently axially sealing against the adjacent outer ring end face of the antifriction bearing.

* * * * *